United States Patent
Welker et al.

(10) Patent No.: US 7,755,970 B2
(45) Date of Patent: Jul. 13, 2010

(54) METHODS FOR CONTROLLING MARINE SEISMIC EQUIPMENT ORIENTATION DURING ACQUISITION OF MARINE SEISMIC DATA

(75) Inventors: Kenneth E. Welker, Nesoya (NO); Johan Olof Anders Robertsson, Oslo (NO); Jens Olav Paulsen, Reistad (NO)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 11/767,389

(22) Filed: Jun. 22, 2007

(65) Prior Publication Data

US 2008/0316859 A1 Dec. 25, 2008

(51) Int. Cl.
*G01V 1/38* (2006.01)

(52) U.S. Cl. .......................................... 367/16; 367/15

(58) Field of Classification Search .................... 367/15, 367/16, 17, 18; 114/242, 243, 244
See application file for complete search history.

(56) References Cited

U.S. PATENT DOCUMENTS

| | | | |
|---|---|---|---|
| 5,790,472 A * | 8/1998 | Workman et al. | 367/19 |
| 6,671,223 B2 | 12/2003 | Bittleston | |
| 7,092,315 B2 | 8/2006 | Olivier | |
| 2003/0220743 A1 * | 11/2003 | Van Steenwyk et al. | 702/9 |
| 2006/0176774 A1 | 8/2006 | Toennessen | |
| 2006/0176775 A1 * | 8/2006 | Toennessen | 367/16 |
| 2006/0256653 A1 | 11/2006 | Toennessen et al. | |
| 2006/0285434 A1 * | 12/2006 | Welker et al. | 367/19 |
| 2007/0025182 A1 * | 2/2007 | Robertsson | 367/18 |
| 2007/0041272 A1 * | 2/2007 | Hillesund et al. | 367/16 |
| 2007/0165486 A1 * | 7/2007 | Moldoveanu et al. | 367/15 |
| 2007/0247972 A1 * | 10/2007 | Aarre et al. | 367/38 |

* cited by examiner

*Primary Examiner*—Jack W. Keith
*Assistant Examiner*—Krystine Saito
(74) *Attorney, Agent, or Firm*—Pramudji, Wendt & Tran, LLP

(57) ABSTRACT

Methods are described for actively steering a towed marine seismic component using one or more actively controllable control members; reducing the actively steering of the control members during duration of a time window of recording seismic reflections from a sub-surface geological feature of interest; and resuming the actively steering of the control members after the time window. The marine seismic component may be a streamer, a source, or both. Other methods allow measuring initial orientation of a streamer based on measuring static control surface angle of a control surface of an inline steerable bird. This abstract is provided to comply with the rules requiring an abstract, and allow a reader to ascertain the subject matter of the technical disclosure. It will not be used to interpret or limit the scope or meaning of the claims.

25 Claims, 4 Drawing Sheets

METHODS FOR CONTROLLING MARINE SEISMIC EQUIPMENT ORIENTATION DURING ACQUISITION OF MARINE SEISMIC DATA

BACKGROUND OF THE INVENTION

1. Field of Invention

The present invention relates to the field of marine seismic equipment and methods of using same in obtaining marine seismic data. More specifically, the invention relates to methods for reducing streamer and/or source steering during time periods of recording seismic data and/or generating seismic signals to improve seismic data quality.

2. Related Art

Marine seismic exploration investigates and maps the structure and character of subsurface geological formations underlying a body of water. For large survey areas, seismic vessels may tow one or more seismic sources and multiple seismic streamer cables through the water. The streamers may be positioned using controllable steerable birds, deflectors, steerable buoys, and the like. During the time period of actually recording marine seismic data by acoustic receivers integrated into or attached to a streamer, it is a goal of marine seismologists to reduce noise, or increase the signal-to-noise ratio. In certain multicomponent streamers it is critical that the orientation of the two axes making up the vertical plane be known to allow data processing operations to adequately de-ghost the seismic data. Knowledge of the orientation of these axes would also benefit other data processing activities, such as interpolation of received seismic data, wavefield interpretation, data filtering, particle motion data analysis, and the like. "Ghosting" and "deghosting" of marine seismic data are well-known terms of this art. Presently, no interruptions of streamer or source steering actions are undertaken due to data recording considerations, as in theory the streamers and sources will be in the best positions for recording data. (In certain embodiments in practice today, sources may include one or more hydrophones in order to check the quality of the source signal(s), and this is known as a calibrated marine seismic source, or CMS. This is sometimes referred to as the "near field signature." Up/down signal decomposition has been achieved previously with over/under sources and over/under streamer data acquisition.

It would be an advance in the art if methods for controlling streamer and/or source orientation could be devised using reduced steering during time periods of recording seismic data and/or generating seismic signals to improve marine seismic data quality.

SUMMARY OF THE INVENTION

In accordance with the present invention, methods are described for controlling the marine seismic equipment (sources and/or streamers) during data recording and/or during generation of marine seismic signals. The methods of the invention reduce or overcome problems with previous methods of steering marine seismic equipment and the sometimes attendant problems steering causes for the gathering and interpreting of marine seismic data obtained using towed marine seismic sources and streamer cables. Methods of the invention may be used to collect and improve data quality in marine seismic surveys, for example 3D and 4D marine seismic surveys.

A first aspect of the invention are methods, one method comprising:

(a) actively steering a towed marine seismic component using one or more actively controllable control members;

(b) reducing active steering of the control members during duration of a time window of recording seismic reflections from a sub-surface geological feature of interest; and (c) resuming the active steering of the control members after the time window.

As used herein "marine seismic component" may be a marine seismic streamer or a marine seismic source having one or more sub-arrays, each sub-array comprising one or more source members, such as air guns, vibrators, and the like for generating seismic signals. The "actively controllable member" may be any streamer controller, one example being those known under the trade designation "Q-FIN", available from WesternGeco LLC; a deflector commonly used to pull streamers laterally (such as the wing-shaped devices known under the trade designation "MONOWING" from WesternGeco LLC", or a door-type deflector), or a lateral source steering mechanism (such as described in assignee's co-pending published U.S. application no. 20060176774, published Aug. 10, 2006, incorporated herein by reference, or winch mechanisms, and the like. Methods within the invention allow higher quality marine seismic data to be collected, wherein higher quality means higher signal to noise ratio. In this definition, noise may be of very different character (e.g., coherent vs. random noise and shot-generated vs. non-shot-generated noise) and have different origins. For example, in this invention we can avoid introducing so-called noise-behind-the-signal due to unwanted perturbations in the measurement of the seismic data (e.g., due to changing orientation of a 3C accelerometer during the recording of the data from a seismic shot). Another example of noise that the present invention can minimize is that of environmental noise caused by for instance cross-flow of water with respect to the streamer as the streamer is steered in the water. In certain methods of the invention a deterministic estimate of orientation of one or more seismic components, such as streamer sections, sources, and the like, may be made. In certain embodiments, methods within the invention include using the data obtained during time periods of reduced steering for data processing activities selected from interpolation of received seismic data, wavefield interpretation, data filtering, particle motion data analysis, the de-ghosting seismic data collected during the recording of the marine seismic data, and the like. Methods of the invention include those wherein the marine seismic component is a marine seismic streamer having acoustic receivers and other equipment integrated therein, and the control members are actively controllable steerable birds comprising one or more independently controllable control surfaces, which may be wings.

As used herein the terms "actively controllable" and "actively adjustable" are used interchangeably and mean a device that is controlled by one or more automatic process controllers in a process control scheme. In contrast, a "passively" steerable or adjustable device means a device that is not being actively controlled, but nonetheless effects the position of a device to which it is attached or associated with due to water current flowing past it.

The relationship between a steerable bird's body orientation and the wing angle of attack of the steerable bird is deterministic (regardless of whether it is active or passive steering). Likewise, the relation between a steerable bird's body, attached inline of the streamer, and streamer with regard to orientation is deterministic. Thus, certain methods of the invention comprise measuring the wing angle of attack of one or more wings of one or more steerable birds during time periods of reducing steering (in certain embodiments during no steering), and using this information in determining the orientation of seismic components, such as acoustic signal receivers (and/or optionally other instrumentation) in the streamer. The seismic streamers may be those known as multicomponent streamers, wherein "multicomponent" refers to a combination of seismic data sensors that includes two or more closely-spaced (within a fraction of the minimal wavelength of interest) seismic sensors such as a hydrophone, a geophone, an accelerometer, or a pressure gradient configuration of hydrophones. "4C," for example, refers to a particular type of multicomponent seismic data resulting from the combination of a hydrophone with three orthogonally oriented geophones or accelerometers. By reducing steering (for example by reducing the frequency of signal updating from a controller) of one or more of the wings during periods of data recording, an operator can assure the success of resolving the components of the gravity vector in the vertical plane of the streamer.

In certain embodiments, wherein the steerable bird has two or more control surfaces, one or more control surface may be reduced in steering while the remaining control surfaces continue receiving steering control signals. (As used herein "reduced steering" means steering slightly less aggressively, or steering a lot less aggressively, or stopping steering altogether for a time period.) For example, in actively steerable birds using four control surfaces, wherein two control surfaces are employed for lateral position control, and two are used for depth (vertical) control, the wings receiving depth control update may continue receiving a high rate of control updates, while the lateral control wings are reduced in control signal updates. The converse may also be possible and is considered within the invention, but as depth control is important for many reasons, it is likely that lateral control reduction would be favored by those operating the equipment and those interpreting the data alike. Another embodiment could be where there are time periods of reduced lateral steering, followed by time periods of reduced vertical steering, in alternating fashion, or in 2:1 ratio or some other ratio of time periods. Streamer cable orientation may be estimated by resolving the gravity vector into components of the y and z-axes that form the vertical plane. If the steamer cable were rotating during the period of data acquisition, the ability to resolve the gravity vector in the two axes would be difficult or impossible given the recording constraints. Controlling the roll of the streamer during this period will make resolving the gravity vector more accurate.

In certain other methods, two or more streamers may be arranged in over/under configuration, each streamer having a plurality of acoustic receivers, the streamers connected substantially vertically by connecting means, as described in assignee's published US patent application number 20060176774, published Aug. 10, 2006, incorporated herein by reference. In these embodiments, either the steerable bird wings, or steerable components of the connecting means, or both, may be used to determine the orientation of seismic components embedded in or attached rigidly to a seismic streamer.

In yet other embodiments, the marine seismic component is a marine source comprising one or more source arrays, each array comprising one or more acoustic source members, for example air-guns, vibrators, and the like, and optionally one or more hydrophones for recording near field signature in a calibrated marine source. When towed by a vessel, and steered or pulled in the cross-line direction during towing (as described in the above-mentioned 20060176774, published Aug. 10, 2006, incorporated herein by reference), and/or adjusted in inline position (such as described in assignee's co-pending U.S. application Ser. No. 11/385,440, filed on Mar. 21, 2006, incorporated herein by reference (14.0294)), the source geometry may be constantly changing during corrective movements initiated by, for example port and starboard winches pulling laterally, or by inline positioning adjustments made by actively controllable control members. In these methods, these adjustments (either the lateral, the inline, or both) may be reduced or stopped just before the source members are fired to generate a marine seismic signal (and, if present a near field hydrophone records the source signature) and resumed after the sources are fired. This may be accomplished by modification of existing computer control algorithms.

As used herein "body", when discussing a steerable bird, means a substantially rigid section of a steerable bird whose geometry does not change significantly, as opposed to a flexible cable, for example. The body may be substantially solid, or may define an internal space, or have a portion of which defines an internal space capable of housing electronic, pneumatic, hydraulic or other functional components used in steering the orientation member and communicating with other seismic equipment, including computers. Methods of the invention include measuring the wing angle, wherein the measuring is selected from a motor counter starting from a known orientation, an acoustic method, a magnetic method, an inertial method, an inclination method, and combinations thereof. The steerable birds may be remotely controllable and comprise one or more moveable wings or fins for control surfaces. The wings may be removably attached to the body, and may be controlled independently. Other methods of the invention are those wherein the steerable bird comprises a rigid extension from the body having a known angle to and length from the body, the extension comprising one or more sensors located within or on the extension. Although the wing angles are deterministic of steerable bird body orientation, methods of the invention may include measuring vertical orientation of the orientation member body, such as by measuring pressure differential on the body, measuring inclination of the body, or some combination thereof, as a check on the deterministic calculation. This optional measuring may include using a tri-axial magnetometer removably attached to the body, measuring the magnetic field strength and direction relative to axes of the body, measuring the direction of an acoustic signal relative to the body axes, differencing acoustic arrival times at a tri-axial hydrophone arrangement with known alignment relative to axes of the body (see for example assignee's co-pending U.S. application Ser. No. 11/460,132, filed Jul. 26, 2006, incorporated herein by reference), measuring a gravity vector relative to the body axes, and combinations of these. Methods of the invention allow and assure the success of resolving the components of the gravity vector in the vertical plane of the streamer. The gravity vector may be measured using a device selected from a tri-axial accelerometer, an inclinometer, a gimbaling system, pressure gauges, and combinations thereof, such as a gimbaled tri-axial accelerometer.

Another method of the invention comprises:
  (a) steering a towed marine seismic multicomponent streamer by active steering of one or more actively controllable streamer control members that cause rotation of the streamer;
  (b) reducing the active steering of the streamer control members during duration of a time window of recording seismic reflections from a sub-surface geological feature of interest using the multicomponent streamer; and (c) resuming the active steering of the streamer control members after the time window.

Another method of the invention comprises:

(a) steering a towed marine seismic streamer using one or more actively controllable steerable birds each comprising actively controllable wings, at least some of the wings dedicated to lateral steering and at least some of the wings dedicated to vertical control, the streamer having a plurality of sensors integrated therein;

(b) reducing the steering of the wings dedicated to lateral steering during duration of a time window of recording seismic reflections from a sub-surface geological feature of interest; and (c) resuming the steering of the wings dedicated to lateral steering after the time window passes.

Methods within this aspect of the invention include methods wherein step (a) comprises laterally over-steering of the one or more actively controllable steerable birds comprising wings dedicated to lateral steering, and step (b) comprises stopping the lateral steering and allowing the streamer to drift with the prevailing current during the duration of the time window of recording seismic reflections from the sub-surface geological feature of interest. As used herein, the term "over-steering" means steering more aggressively, for example past a target point, for a time period. Further, this method may include a computation step that predicts the amount of over-steering needed to position the streamer in the target zone using the prevailing current. Target zone means optimal coordinates needed to satisfy the geophysical objective identified for the survey.

The recorded seismic data from any method within the invention may be used to compute a time-lapse signal. At least two benefits are (1) better repeatability since we can steer seismic components very aggressively when not recording reflections from the reservoir and (2) lower steering noise since we can stop steering when the reservoir reflections arrive at the sensors in the streamer or streamers. Methods of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics can be obtained is explained in the following description and attached drawings in which.

Figure 1:
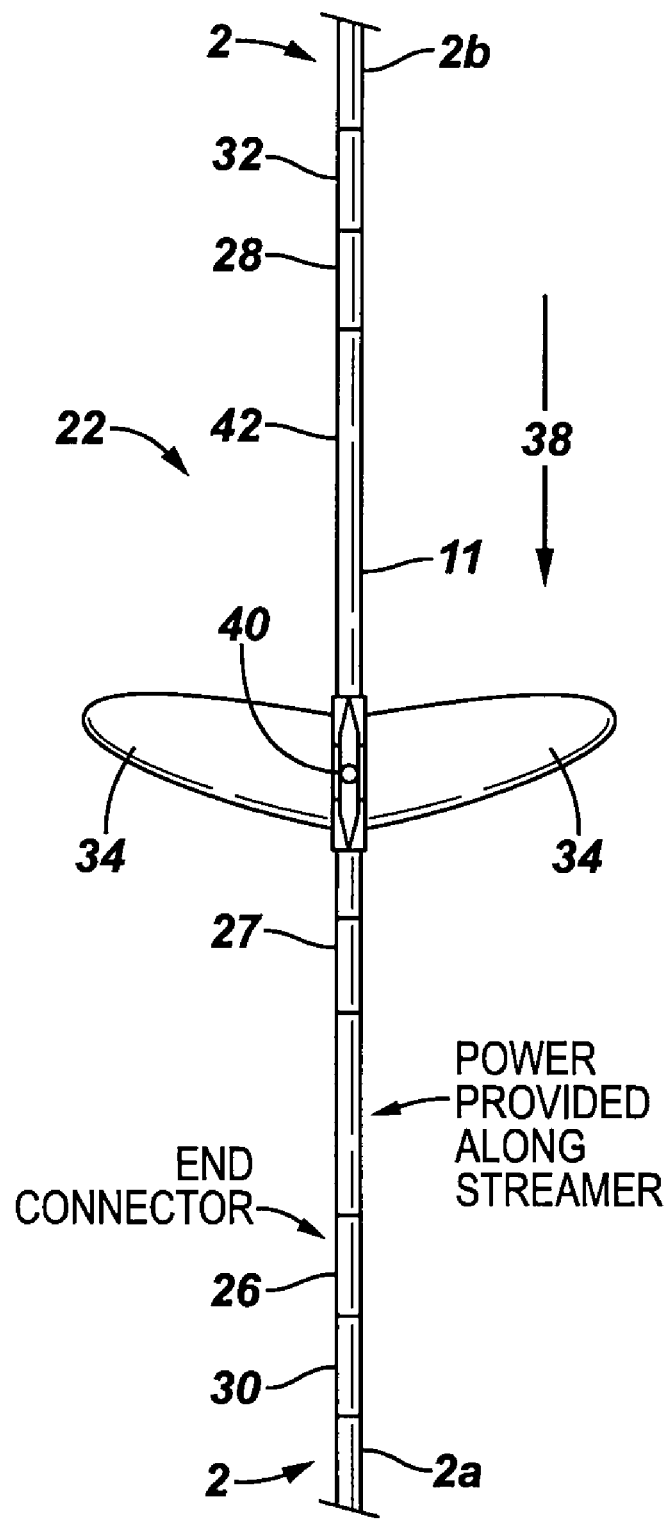
FIG. 1 is a schematic representation of a prior art steerable bird useful in the present invention.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romantic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

The phrase "control member" means a device capable of movements that may result in any one or multiple straight line or curved path movements of a marine seismic component, such as a streamer or marine seismic source, in 3-dimensions, such as lateral (horizontal), vertical up, vertical down, and combinations thereof. The terms and phrases "steerable bird", "cable controller", "streamer control device", and like terms and phrases are used interchangeably herein and refer to orientation members having one or more control surfaces attached thereto or a part thereof. A "steerable front-end deflector" (or simply "deflector") such as typically positioned at the front end of the outer streamers, and other deflecting members, such as those that may be employed at the front end of seismic sources or source arrays, may function as control members in some embodiments, although they are primarily used to pull streamers and steer sources laterally with respect to direction of movement of a tow vessel.

The term "control", used as a transitive verb, means to verify or regulate automatically in closed loop fashion by comparing with a standard or desired value, and when used as a noun ("controller") means a mechanism that controls automatically in closed loop fashion. Control may be feedback, feed-forward, cascade, adaptive, predictive, heuristic and combinations thereof.

The present invention relates to methods for reducing or stopping streamer and/or source steering during time periods of recording seismic data and/or generating seismic signals to improve seismic data quality, for example, but not limited to, reducing ghost signals received by signal recording instruments of a marine seismic streamer. The reduction or stoppage in steering may be for an entire duration of a seismic shot, or measured by a time window for an object of interest (e.g., seismic reflections from a (potential) hydrocarbon reservoir) to be shot. As such, the time period for reducing or stopping the active steering of the control members may range from 0.5 seconds up to about 15 seconds, in an extreme case. Horizontal and vertical control of streamers is typically provided today by control members, which may be of any type as explained herein, such as small hydrofoils or steerable birds that may provide forces in the vertical and horizontal planes. Front end spread control devices such as known as "MONOWING", and more conventional deflectors and doors may also control streamer lateral position. Such devices may also be used to control laterally along the streamer length. Control members may be equally or non-equally spaced along the length of the streamers, and may be inserted inline in streamers, clamped to streamers, and in some embodiments hung from streamers using rigid connectors, or to provide the desired vertical and horizontal position control. Additional control members may be placed at intervals between main control members for supplemental position control, for example to reduce streamer "sagging" between locations where main control members are located on streamers. In some embodiments of the invention it may be possible to change the streamer configuration during the seismic survey using control members, optionally assisted by a winching system or other arrangement to alter the length of cables.

One type of control member which may be utilized in steering of marine seismic streamers in accordance with the invention is described in commonly assigned U.S. Pat. No. 6,671,223, describing a steerable bird known under the trade designation "Q-FIN", available from WesternGeco, that is designed to be electrically and mechanically connected in series (i.e., inline) with a streamer. Other steering devices may be used that are currently attached to seismic streamers to steer the streamers cross line for a desired shape, position, or both. Steering may be achieved through lift afforded by two or more independent wings or fins that rotate around an axis perpendicular to the wing axis controller body. A further description of a two-winged cable controller device known under the trade designation Q-FIN may be found in reference to FIG. 1, herein below.

In previously known streamer and source steering control algorithms, the impact of steering during periods of data recording and seismic signal generation were not considerations, as the effect of steering for positioning of the streamers and source was considered more important than noise generation considerations. Also, the effects of steering the streamer on the rotation of the streamer were not well understood. However, when using multicomponent streamers it is critical that the orientation of the two axes making up the vertical plane through the streamer be known during the period of recording seismic data using sensors embedded in the streamer. The relationship between a steering device's body orientation and the wing angle of the steering device is deterministic. Likewise, the relation between a steering device's body orientation and a streamer's orientation is deterministic (at least for steering devices whose bodies do not rotate about the streamer). Thus the orientation of instrumentation integrated into a streamer may be determined by measuring one or more wing angles in relation to the current (angle of attack) of steerable birds used inline of this type of streamer. The wing angles may be controlled to experience time periods of reduced or no steering during certain time periods of data recording to improve resolving the components of the gravity vector in the vertical plane of the streamer.

Streamer cable orientation may be estimated by resolving the gravity vector into components of the x-, y- and z-axes that form the vertical plane. If the streamer were being vertically controlled to search for the most favorable current, (as discussed in assignee's co-pending application Ser. No. 11/179,922, filed Jul. 12, 2005, incorporated herein by reference) the streamer may not be substantially normal to the gravity vector, in which case the gravity vector could be distributed across all three accelerometer axes of the cable. If the cable were rotating during the time period of data recording, the ability to resolve the gravity vector in the two axes would be difficult or impossible given the recording constraints. Controlling the roll of the streamer during this period will make resolving the gravity vector more accurate. One set of methods of the invention involves reducing, limiting, or ceasing some or all control members' steering during data recording periods. Certain methods of the invention involve using a static wing angle at the start of a data recording period (i.e., after a time period of reduced, limited, or ceased control member steering) to estimate the orientation of the streamer cable or other seismic equipment.

Figure 3:
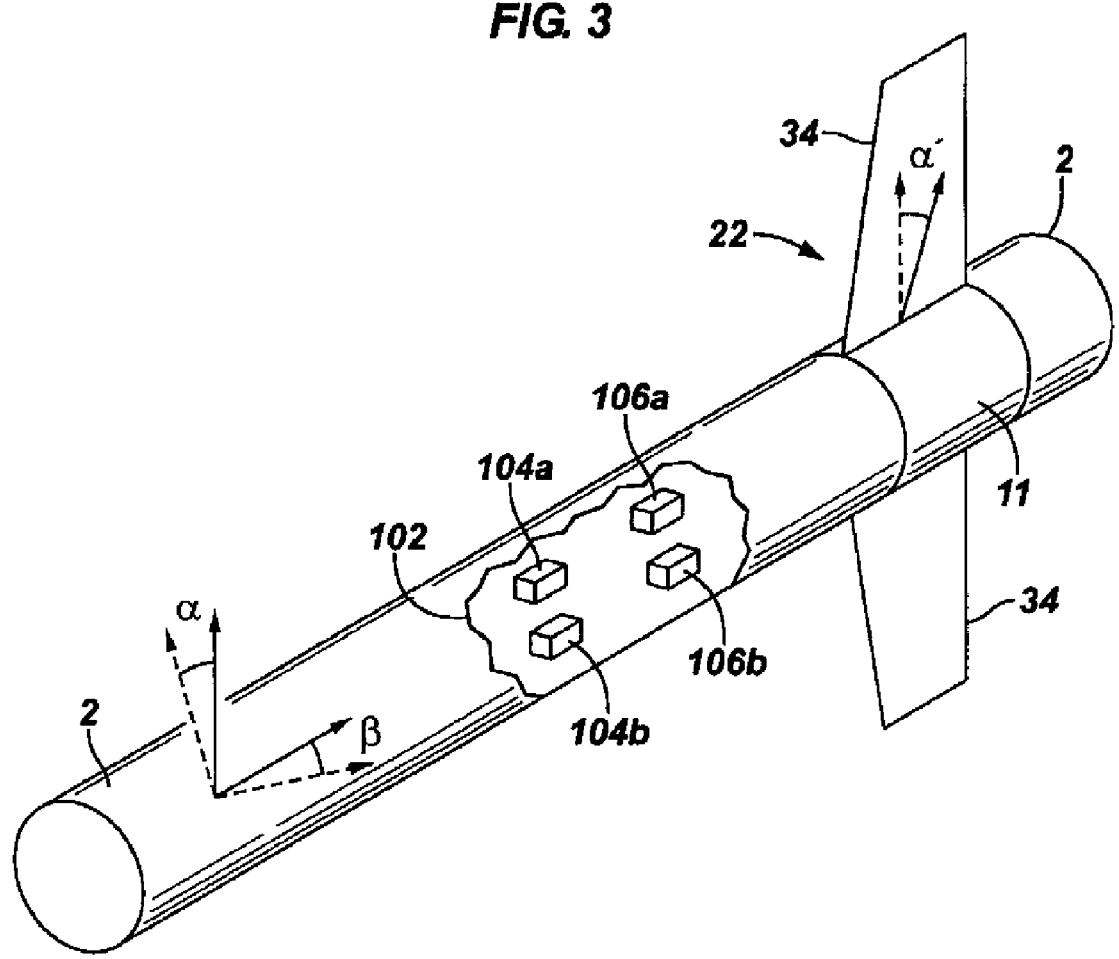
FIG. 3 illustrates a perspective view, with portions cut away, of a streamer comprising embedded seismic equipment therein whose orientation may be determined using methods of the invention.

One streamer control device, or "steerable bird", useful in the invention is indicated generally at 22 in FIG. 1, and comprises an elongate streamlined body 11 adapted to be mechanically and electrically connected in series in a multi-section marine seismic streamer 2 of the kind which is towed by a seismic survey vessel and which is used, in conjunction with a seismic source also towed by the vessel, or by a separate vessel, to conduct seismic surveys, as briefly described hereinbefore. Identical reference numerals are used throughout the drawing figures when the same component or element is referred to in different figures. To permit such connection, each end of the body 11 is provided with a respective mechanical and electrical connector 27, 42, these connectors being complementary to, and designed to interconnect with, streamer end connectors 26, 28 respectively which are normally used to join together adjacent sections 2a and 2b of streamer 2. The bird 22 is provided with two opposed control surfaces, or wings, 34, typically molded from a fiber-reinforced plastics material, which project outwardly from the body 11 and which are independently rotatable about a common axis extending substantially perpendicularly through the longitudinal axis of body 11. Rotation of wings 34 is effected under the control of a control system 40 sealingly housed within body 11. By "wing angle" is meant the angle of rotation of the wing from an arbitrary nominal position. The arbitrary nominal position may be the longitudinal axis of the steerable bird body. Wings 34 may be generally ogival (i.e., rounded) and swept back with respect to the direction of tow of streamer 2 (which direction is indicated by the arrow 38), in order to reduce the possibility of debris becoming hooked on them, although this is not essential, and other wing shapes are possible (such as depicted in FIG. 3, for example). To facilitate their rapid removal and reattachment, wings 34 may be secured to body 11 by respective quick-release attachments.

Streamer 2 may either be a "mono-component" streamer, comprising essentially only hydrophones or hydrophone clusters or hydrophone groups spaced at regular group intervals, or a "multicomponent" streamer including two or more types of streamer sections, including hydrophones, and optionally other sensors (for example geophones, or pressure gradient arrays of hydrophones, pressure sensors, particle motion sensors, and the like), distributed along its length; it may also include control and conversion circuitry for converting the outputs of the sensors into digital data signals, longitudinally extending control and data lines for conducting control and data signals to and from the control and conversion circuitry, and electrical power supply lines for supplying electrical power from the vessel to the circuitry. All these lines are coupled together from the streamer section 2a to the streamer section 2b via respective corresponding lines 30, 32 which extend through body 11 of the bird 22 between the connectors 27, 42. Additionally, control system 40 is connected to receive control signals and electric power from respective ones of the lines 30, 32. The greater part of the length of body 11 of bird 22 is flexible, the only rigid parts being the connectors 26, 28, and a short central housing section which houses the control system 40 and from which wings 34 project. This central housing section, which is made of aluminum or titanium and has holes passing longitudinally there through for the passage of Kevlar or other stress members which bear the longitudinal loads on body 11, is kept as short as possible, typically around 40 cm, so that once the wings 34 have been detached from body 11, streamer 2 can be wound onto and unwound from the large drum used for storing the streamer, with the body 11 still connected in the streamer. The quick-release attachments permit the removal and attachment of wings 34 to be at least partly automated as the streamer 2 is reeled in and out during the survey.

Figure 2:
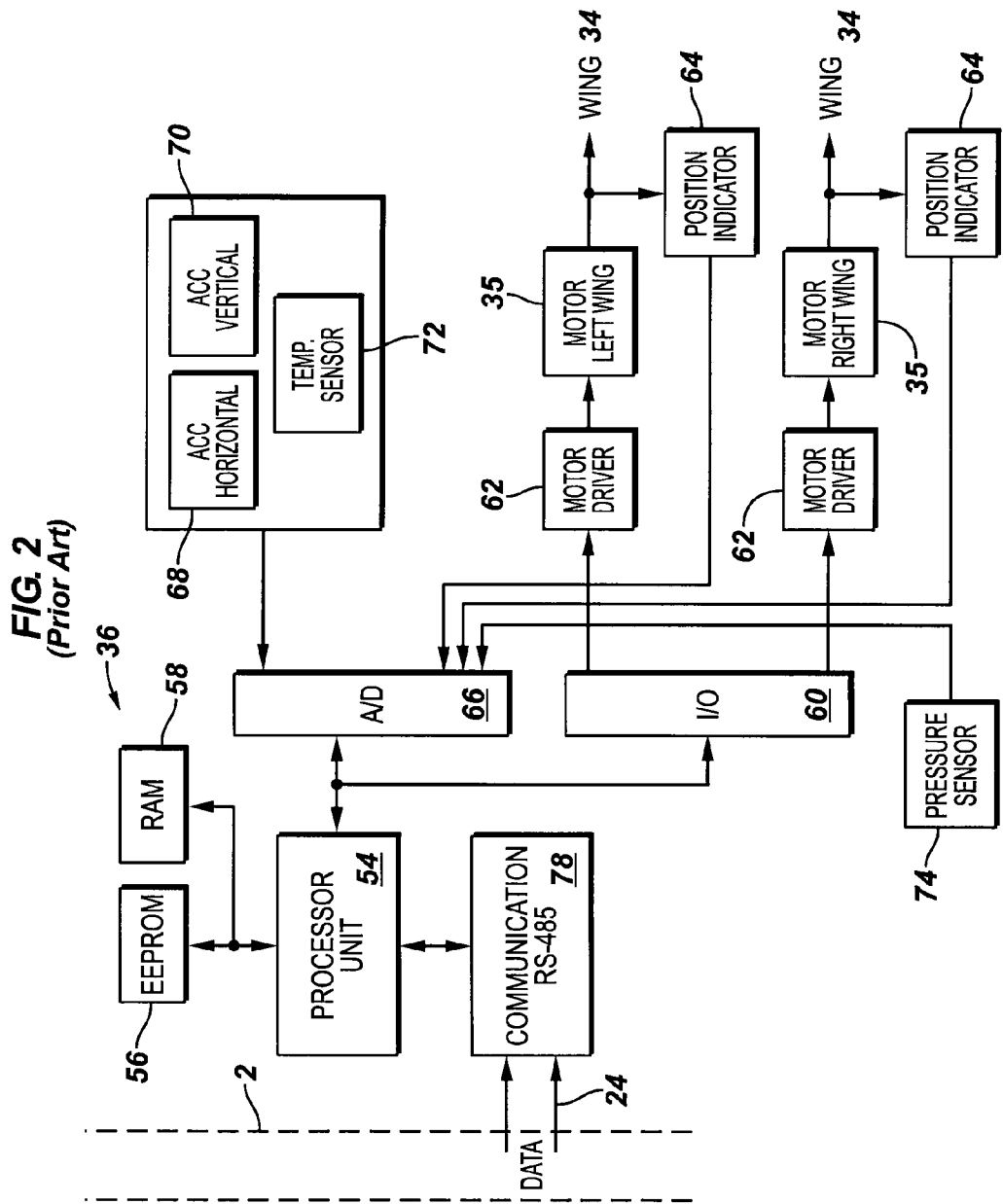
FIG. 2 is a schematic illustration of a prior art control scheme useful in methods of the invention.

FIG. 2 is a schematic diagram of a prior art architecture of a local control system 36 useful in the present invention for a steerable bird 22. The local control system 36 may comprise a central processor unit 54, having EEPROM 56 and RAM 58 memory, an input/output subsystem 60 that is connected to a pair of motor drivers 62, and an analog to digital conversion unit 66. The motor drivers 62 are connected to and actuate wing motors 35 to produce the desired change the orientation of the wings 34 with respect to bird body 11. In reducing steering or stopping steering of a streamer control member, the local control system 36 may be modified to produce the desired reduction in or stoppage in steering.

The wing motors 35 and wings 34 may be connected to wing position indicators 64 that sense the relative positions of the wings and provide wing angle measurements to the analog to digital conversion unit 66 which converts the analog wing position indicator 64 measurements into digital format and conveys these digital values to the central processor unit 54. Various types of wing position indicators 64 can be used, including resistive angle or displacement sensors, inductive sensors, capacitive sensors, hall sensors, or magneto-restrictive sensors.

A horizontal accelerometer 68 and a vertical accelerometer 70, placed at right angles with respect to one another, may also be connected to the analog to digital conversion unit 66 and these accelerometers used to convey measurements that allow the central processor unit 54 to determine the roll angle and roll rate of the bird 22. An angular velocity vibrating rate gyro (rategyro) may also be used to measure the roll rate of a bird 22. A temperature sensor 72 may be connected to the analog to digital conversion unit 66 to provide temperature measurements that allow the horizontal accelerometer 68 and the vertical accelerometer 70 to be calibrated.

A pressure sensor 74 may also connected to the analog to digital conversion unit 66 to provide the central processor unit 54 with measurements of the water pressure at the bird 22. To calculate an appropriate depth value, the measured pressure values may be filtered in known fashion to limit the disturbance from waves. This may be done with a weight-function filter that avoids the large phase displacements caused by mean value filters.

The central processor unit 54 may be connected to a RS485 communications unit 78 that allows information to be exchanged between the local control system 36 and a global control system (not illustrated) over a communication line 24 that passes through the streamer 2. The RS485 bus may, for instance, utilize Neuron chips that communicate using a Local Operating Network protocol to control the data transfer.

The central processor unit 54 and associated components may comprise a MicroChip 17C756 processor. This type of microprocessor has very low power requirements, a dual UART on-chip, 12-channel, 10 bit ADC on-chip, 908x8 RAM, 16 kx16 ROM, and 50 digital I/O channels. The software running on the central processor unit 54 may be comprised of two units, the local control unit and a hardware control unit. It is typically not possible to pre-load both of these program units into the EEPROM 56 and it is possible to update these program units without having to open the bird 22. The on-chip memory may thus only initially contain a boot-routine that enables the loading of software units into the external memory via the RS485 communication unit 78. The external program memory (EEPROM 56) will typically be a non-volatile memory so that these program units do not have to be re-loaded after every power down.

The central processor unit 54 must be able to run the local control system software fast enough to secure the sampling frequency needed for effective local bird control. This may mean, for instance, a sample rate of 10 Hz, which may be 10 to 100 times faster than the sample rate of the communications between the global control system and the local control system 36. As discussed above, the central processor unit 54 will also receive data from sensors attached to the bird 22, in particular for the purposes of the present invention, the wing angles. These values are typically delivered to the central processor unit 54 at a sample rate of at least 10 Hz. The following values may be transmitted from the local control system 36 to the global control system using the RS485 communication unit 78: the measured roll angle, the measured roll rate, the measured wing angles, the measured water pressure, the calculated depth, and the calculated wing forces.

The system may be designed with a redundant communication system to increase its overall reliability. The bird 22 will typically have a backup communications channel, such as by overlaying a backup control signal on top of the power line current. This backup communications channel is particularly important because in the event of loss of communications to the bird 22 there would otherwise be no method for instructing the bird to bring the streamer 2 to surface so the defective communications equipment can be repaired or replaced.

As stated previously, one set of methods of the present invention utilize knowledge of wing angles and the deterministic orientation relationships of the wings, control member body, and streamer. These relationships are used to determine a more precise estimate of the orientation of components embedded in a multicomponent streamer, or attached rigidly thereto, in particular the orientation of the two or three axes making up the vertical plane during periods of recording seismic data (if the streamer's lengthwise axis is not horizontal, some probably small component of the gravity vector will be felt in the inline axis). Wing position indicators 64 in a control system 36 such as that illustrated in FIG. 2 may be used to obtain the wing angles, and thus determine orientation of components embedded in the streamer through a simple deterministic algorithm.

Rather than with a model or estimating the wing angles, the best way to determine wing angle orientation is by measuring it. One of several measurement mechanisms may be employed, selected from acoustically, with a magnetic compass, tri-axial magnetometers, inertial positioning devices, inclinometers, hall sensors, and any combination of two or more of these techniques.

In other methods of the invention, a bird may be suspended from a streamer by a rigid or semi-rigid member of known length. Such steerable birds are sometimes referred to as "hanging birds". The bird wing orientations may be determined as described with respect to the inline bird illustrated in FIG. 1 using wing position indicators as described in reference to FIG. 2, and since the length of the rigid or semi-rigid member is known, the orientation of sensors embedded in the streamer may be determined. There exist many combinations of sensors and sensing strategies to determine orientation of wing angles, and the invention is not limited to the techniques discussed herein.

FIG. 3 illustrates in perspective view a streamer having seismic components embedded therein, illustrating certain features of the present invention. Streamer 2 includes a steerable bird 22 having wings 34. An angle α' is illustrated between a dotted arrow and a solid arrow. The dotted arrow is co-existent with wing 34, while the solid arrow indicates an arbitrary nominal position of the wing. Also illustrated in FIG. 3 are angles α and β, where angle α defines the orientation of seismic elements 104*a* and 104*b*, which might be hydrophones, or some other seismic instruments, such as accelerometers, geophones, particle motion sensors, and the like 106*a* and 106*b*, embedded in streamer 2. The seismic instruments 104*a*, 104*b*, 106*a*, and 106*b* are viewable in a cut-out portion 102 of streamer 2. It will be understood that there may be more or less seismic instruments in the streamer. Angle β defines an inclination of streamer 2 away from horizontal, which may be useful for positioning of streamer 2. As may be seen schematically in FIG. 3, knowledge of one or more wing angles α' is deterministic of relative orientation of seismic instruments 104*a* and 104*b*, and of seismic instruments 106*a* and 106*b*. Therefore, during time periods when the wings experience reduced steering control signals, or no steering control signals, or, stated differently, when steering adjustments of wings 34 are interrupted temporarily, if the static wing angles are measured, then the orientation of the seismic instruments in the streamer are known. This limitation of steering to time periods outside of data recording periods greatly enhances the ability to reduce noise during recording time periods, and should also help in processing of the data, as discussed herein. Moreover, the static wing angles also provide the ability at the start of a data recording period to estimate the orientation of the streamer cable.

Figure 4A:
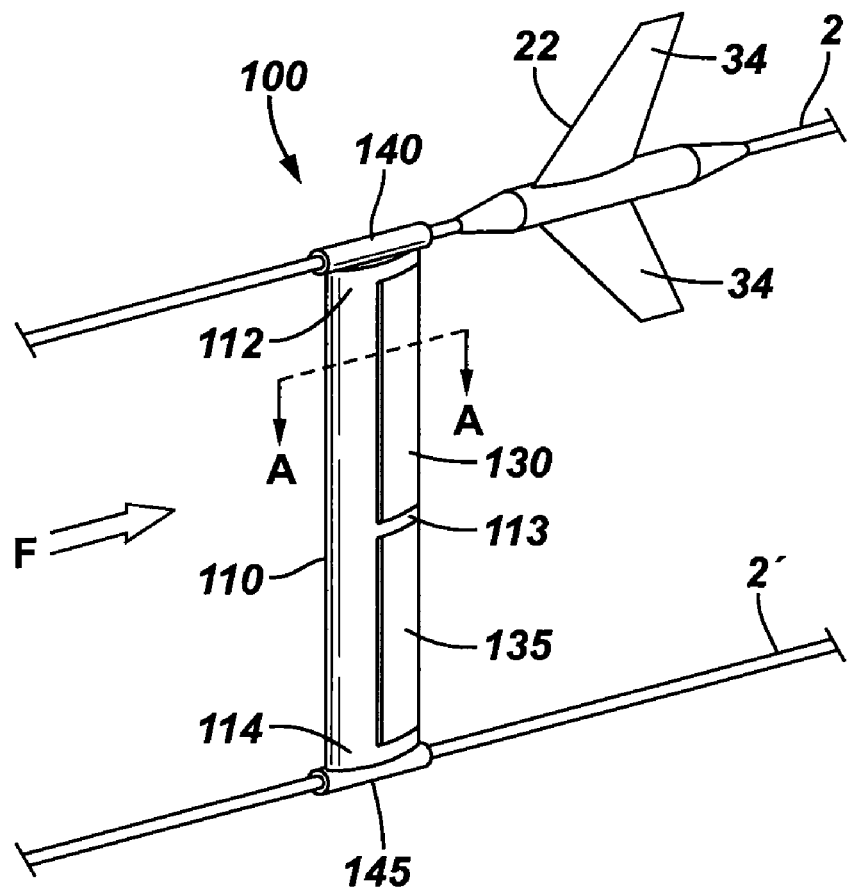
FIGS. 4A and 4B are schematic perspective and cross-sectional views, respectively, of another marine seismic apparatus that may benefit from methods of the invention.
Figure 4B:
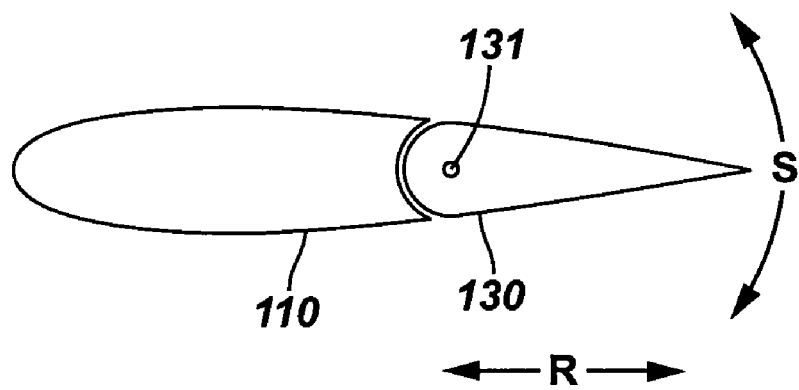

FIG. 4A illustrates a perspective view of a pair 100 of marine seismic streamers connected by a connecting member and which may benefit from methods of the present invention. Streamers 2 and 2' are illustrated in over/under arrangement connected together by an elongate rigid or semi-rigid member 110 having first and second ends 112 and 114 and a central portion 113, end 112 being connected with a first streamer coupler 140, and second end 114 connected via a second streamer coupler 145. The large arrow labeled "F" denotes the direction of travel of water past apparatus 100 when apparatus 100 is in use, being towed by a tow vessel (not illustrated). Streamers 2 and 2' may be positioned a desired distance apart, generally ranging from about 1 to about 50 meters, about 5 meters being typical, although the upper bound for the separation distance is only limited by the materials of construction and the surrounding environment, for example, depth of water, obstruction in the water, and the like. Two independently moveable orientation members 130 and 135, sometimes referred to herein as flaps, are illustrated mounted to and aft of elongate member 110 (referenced to a flow direction, indicated by arrow "F" in FIG. 4A). Alternatively, or in addition thereto, orientation members 130 and 135 may be mounted to streamer couplers 140 and 145, as discussed in more detailed herein. Orientation members may number more or less than two. An even or odd number may be employed, although with an odd number certain other parameters may need adjustment. (For example, with three flaps, the size (surface area) of one flap might be twice the size of the two remaining flaps in order to achieve balanced forces.) Also illustrated is a steerable bird 22 similar to the steerable bird illustrated in FIG. 1. FIG. 4B illustrates a cross-sectional view along the section A-A of FIG. 4A, illustrating the relative position of elongate member 110 and orientation member 130 when orientation member 130 is mounted on a hollow or solid shaft 131. Double-headed arrow "S" illustrates how orientation member 130 might swivel or pivot on shaft 131. Orientation member 135 may be similarly moveable. Orientation members 130 and 135 may either be retractable and extendable in the direction indicated by the double-headed arrow "R", as in retractable airplane flaps, or may be in a fixed position, as illustrated. In any case, the movement S is allowed in at least one direction. In as much as the functions of elongate member 110 are primarily to connect streamers 2 and 2', and serve in controlling distance between streamers 2 and 2', member 110 may be any shape, cross-section, or material of construction as desired. For example, the cross-section of elongate member 110 could be oval or rectangular; its material of construction may be metal, plastic, composite, and the like. One or more parallel, closely spaced elongate members are possible. As well, more than one elongate member may be employed, fit together or joined to form one elongate member, and shaft 131 may comprise more than one shaft. Elongate member 110 could comprise any number of alternative arrangements, including pipe-in-pipe, solid rod-in-pipe, solid rod-in-box arrangements, and the like, allowing sensors, transmitters, receivers, and the like to be carried by elongate member 110.

Although control members 130, 135, and steerable bird 22 are illustrated in FIGS. 4A and 4B positioned aft of elongate member 110 connecting streamers 2 and 2', it will be understood by those of ordinary skill in the art that the control member or members may be positioned forward of elongate member 110, as is known in the aerodynamics art. Moreover, the use of both fore and aft flaps are deemed variants within the present invention. It is also considered within the invention for the control member to comprise one or more birds, for example, a combination of an elongate connection member and a bird attached to each streamer near the connecting points between the streamers and the elongate member. These embodiments may or may not include flaps 130 and 135 as illustrated in FIG. 4A. Steerable birds may be positioned fore or aft of elongate member 110.

Steerable birds useful in the invention may connect to at least one streamer in such a way that it is able to communicate with the outside world, which may be a vessel, satellite, or land-based device. The way this may be accomplished varies in accordance with the amount of energy the steerable birds require and the amount of energy they may be able to store locally in terms of batteries, fuel cells, and the like. If the local storage capacity for batteries, fuels cells, and the like is sufficient, steerable birds may be clamped onto the streamer skin at locations where there is located an inductor inside the streamer skin. Then any particular steerable bird and its streamer can communicate through the skin with electrical impulses. If, on the other hand, a steerable bird needs charging power from the streamer a different approach such as acoustic based communication is required. In this case the steerable bird may be mounted between two streamer sections and as such comprise an insert between two streamer sections, as described herein.

Other streamers useful in the invention include those described in U.S. Pat. No. 7,092,315. As explained in the '315 patent, the eccentric body is either clamped onto the streamer, or connected to the streamer through special connectors to allow the eccentric body to rotate about the streamer. The eccentric body of this streamer steering device is intended to be orientated generally horizontal relative to streamer. The two wings may comprise one unit or two units positioned eccentric of the streamer and are mounted to a wing support element extending from a connector on the streamer to the eccentric body. A generally vertical orientation of the wing(s) is achieved through hydrostatic stability by buoyancy in the upper part of the wing and water or weight elements in the lower part of the lower wing. FIG. 3 of the referenced co-pending application illustrates yet another known streamer steering device, from Sercel. Seemingly it applies the same principles as the device known under the trader designation Q-FIN except that the Sercel device has three control surfaces or wings extending from the body. Whether the wings are independently moveable or not is not known to the present inventor.

Another method of the invention comprises steering a towed marine seismic streamer using one or more actively controllable steerable birds each comprising actively controllable wings, at least some of the wings dedicated to lateral steering and at least some of the wings dedicated to vertical control. In these methods the streamer may have a plurality of sensors integrated therein. These methods comprise reducing or stopping the steering of the wings dedicated to lateral steering during duration of a time window of recording seismic reflections from a sub-surface geological feature of interest; and resuming the steering of the wings dedicated to lateral steering after the time window passes. Methods within this aspect of the invention include laterally over-steering of the one or more actively controllable steerable birds dedicated to lateral steering, and then stopping the lateral steering and allowing the streamer to drift with the prevailing current during the duration of the time window of recording seismic reflections from the sub-surface geological feature of interest. The over-steering may vary in degree of aggressiveness; for example, the over-steering may only be slight, such as for only 1-5 seconds, or from 1 meter up to several meters, or may be more aggressive, perhaps ranging from 10 to 20 seconds, or from 10 to 50 meters, depending on the prevailing currents.

These methods may incorporate one of the so-called Advance Spread Control systems and methods described in assignee's co-pending U.S. patent application Ser. No. 11/122,646, filed Mar. 5, 2005, (published patent application no. 20060256653, published Nov. 16, 2006), incorporated herein by reference. In these systems and methods, a marine seismic spread includes a vessel-mounted acoustic Doppler current meter to measure at least a horizontal component of a current velocity vector at least at one location generally ahead of the seismic spread elements, and a controller adapted to use at least the horizontal component of the measured current velocity vector to control position of a seismic spread element. The controller may control position either before the spread element encounters the measured current ahead of the vessel, or when the spread element passes by the point or location where the current was measured. The described systems may include a seismic spread comprising one or more vessels such as towing vessels, a chase vessel, a work vessel, one or more a seismic sources, and one or more seismic streamers towed by towing vessels. The streamers and sources may be separately towed or towed by the same vessel, and the acoustic Doppler current meter may be mounted on a chase vessel, a work vessel, an AUV, or a tow vessel, as long as it is able to provide the desired data, and may comprise a transducer that produces at least one beam that is horizontal and forward looking, or has a useable forward-looking horizontal component, and may be adapted to measure a current velocity vector at a point ahead of the towing vessel. The controller may control position of all or some of the spread elements through commands given to spread control elements, such as deflectors, steerable birds, and the like. Optionally, the vessel-mounted acoustic Doppler current meter may be motion-compensated, as explained more fully therein. In accordance with the present invention, the controller is modified to reduce or cease steering by suitable modification of the algorithm or algorithms running the controller.

As mentioned previously, in yet other embodiments the marine seismic component is a marine source comprising one or more source arrays, each array comprising one or more acoustic source members, for example air-guns, vibrators, and the like, and optionally one or more hydrophones for recording near field signature in a calibrated marine source. When conducting time-lapse and other marine seismic surveys using towed streamers and sources, conventionally, seismic source arrays are deployed so that fixed distances are maintained from the towing vessel and from the center of the first seismic recording group of the streamers. During the course of a marine data acquisition run, these distances may change due to several factors including crossline current that introduces an angle to the relation between the line from the towing cable/rope and the seismic line direction, often called feather angle when used to describe the same relation but for streamers. In addition to crossline feather, changes in the inline component of the current may alter the tension on the towing ropes for individual source arrays, which may then stretch or contract, changing the distances from the vessel to the to the source arrays, and from the source arrays to the center of the first seismic recording group. Adjustments may be made during line change, but recently there have been developed systems and methods to actively control these separation distances in real time during the course of a marine seismic data acquisition run. See for example the discussion in assignee's co-pending U.S. application Ser. No. 11/385,440, filed Mar. 21, 2006 (14.0294, Eskild Storteig, et al.). Prior to the systems and methods disclosed therein, a vessel operator viewed the source arrays and streamers, and perhaps took into consideration wind, wave and current data, in steering the vessel in an effort to keep the streamers and the center of source on their respective track lines, while also minimizing inline skew. Systems and methods were known to automate the steering feedback loop, by introducing an automatic controller that controls vessel position in such a way that the source is on or close to a desired preplot line; however, the known systems did not account for inline skew. Thus even if the source and streamers were on their respective preplot tracks, the center of the source arrays may be experiencing inline skew. Systems and methods of the referenced application were meant to correct for this inline skew, and may also utilize measurements of environmental conditions, including but not limited to wind magnitude and direction, and current magnitude and direction. Other options include using a feed-forward technique, where a separate controller may be added that takes these environmental conditions into account and performs a proactive reaction so as to minimize the environmental effect on the zero inline slew objective. By performing these functions automatically, an optimally tuned PID and optionally a feed forward, or other controller strategy may command an algorithm within a seismic source deployment sub-system so that deviations from the inline skew objective are corrected rapidly and in a stable way. The previous application did not recognize the effects that this positioning may have on noise in the seismic data collected.

When towed by a vessel, and steered or pulled in the cross-line direction during towing, and/or adjusted in inline position, the source geometry may be constantly changing during corrective movements initiated by, for example port and starboard winches pulling laterally, or by inline positioning adjustments made by actively controllable control members. In the methods of the present invention, these adjustments (either the lateral, the inline, or both) may be reduced or stopped just before the source members are fired to generate a marine seismic signal and resumed after the sources are fired. This may be accomplished by modification of existing computer control algorithms. If present a near field hydrophone may record the source signature.

It is within the invention to combine methods of the invention with other position control equipment and methods, such as streamer deflectors and control methods. Some of these may include winching systems, bridle systems, pneumatic systems, hydraulic systems, and combinations thereof, and methods of using same.

As mentioned herein, materials of construction of control members such as steerable birds, streamers, and sources useful in methods of the invention may vary. However, there may be a need to select the seismic equipment so that the system is balanced to be neutrally buoyant in the water, or nearly so, to perform its intended function. Polymeric composites, with appropriate fillers used to adjust buoyancy and mechanical properties as desired, may be employed.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures. Thus, although a clamp-on bird and an inline bird may not be structural equivalents in that a clamp-on bird employs one type of fastener, whereas an inline bird employs a different fastener, in the environment of using birds to position streamers, a clamp-on bird and an inline bird may be equivalent structures.

What is claimed is:

1. A method comprising:
   (a) laterally over-steering a towed marine seismic streamer using one or more actively controllable deflectors, the streamer having a plurality of sensors integrated therein;
   (b) stopping the lateral over-steering;
   (c) allowing the streamer to drift with a prevailing current during a time period in which seismic reflections from a sub-surface geological feature of interest are being recorded; and
   (d) resuming lateral over-steering of the deflector after the time period expires.

2. The method of claim 1, wherein the marine seismic component is a multicomponent streamer.

3. The method of claim 2, wherein the control members comprise one or more actively controllable steerable birds inline of the streamer comprising controllable wings.

4. The method of claim 3, comprising measuring wing angle of one or more wings of the one or more actively controllable steerable birds, wherein the multicomponent streamer comprises two or more sensors arranged in over/under configuration, and using the wing angles to determine the orientation of the sensors arranged in over/under configuration.

5. The method of claim 4, comprising freezing the wing angles of all actively controllable birds during the time periods of recording marine seismic data.

6. The method of claim 2, comprising estimating streamer orientation by resolving components of the gravity vector in a vertical plane of the streamer.

7. The method of claim 6, wherein the resolving comprises resolving the gravity vector into at least two components of the x, y and z-axes that form the vertical plane.

8. The method of claim 7, comprising measuring the gravity vector relative to axes of a body of a steerable bird and comparing the measured gravity vector with the value obtained by estimating.

9. The method of claim 8, wherein the gravity vector is measured using a device selected from a tri-axial accelerometer, an inclinometer, a gimbaling system, and combinations thereof.

10. The method of claim 1, wherein the marine seismic component comprises two marine seismic streamers arranged in over/under configuration, each streamer having a plurality of sensors integrated therein, the two streamers connected together by one or more means for connecting, and the control members comprise one or more actively controllable steerable birds inline of each of the streamers, the steerable birds comprising controllable wings.

11. The method of claim 1, wherein the marine seismic component is a marine seismic source, the marine seismic source comprising one or more source arrays, each source array comprising one or more acoustic source members, the marine seismic source trailing behind a towing vessel.

12. The method of claim 11, wherein the one or more actively controllable control members comprises port and starboard actively controllable steering components steering the source to port and/or starboard, the method comprising reducing active lateral steering of the control members during a duration of a time window of generating a seismic source signal.

13. The method of claim 11, wherein the one or more actively controllable control members comprises one or more actively controllable steering components actively adjusting the inline position of the source, the method comprising reducing the active adjusting of the inline position during duration of a time window of generating a seismic source signal.

14. The method of claim 12, wherein the one or more actively controllable control members comprises one or more actively controllable steering components actively adjusting the inline position of the source, the method comprising ceasing the active adjusting of the inline position during duration of a time window of generating a seismic source signal.

15. The method of claim 1, measuring static control surface angle of one or more control surfaces of the one or more inline steerable birds, and using the static control surface angle at the start of the data recording period to estimate orientation of the streamer.

16. The method of claim 1, wherein the step of recording seismic reflections is performed at successive times and the method comprises computing a time-lapse signal.

17. The method of claim 1, wherein the steering is stopped before the towed marine seismic multicomponent streamer encounters the prevailing current.

18. The method of claim 1, wherein the steering is stopped when the towed marine seismic multicomponent streamer passes by a point where the prevailing current is measured.

19. The method of claim 1, wherein the time period is an entire duration of a seismic shot.

20. The method of claim 1, wherein the time period is less than an entire duration of a seismic shot.

21. The method of claim 1 comprising automatically computing an estimate of how much of the over-steering to perform based on water current velocity.

22. A method comprising:
   (a) laterally over-steering a towed marine seismic streamer using one or more actively controllable steerable birds each comprising actively controllable wings, at least some of the wings being dedicated to lateral steering and at least some of the wings being dedicated to vertical control, the streamer having a plurality of sensors integrated therein;
(b) stopping a lateral steering of the wings dedicated to lateral steering;
(c) allowing the streamer to drift with a prevailing current during a time period in which seismic reflections from a sub-surface geological feature of interest are being recorded; and
(d) resuming the steering of the wings dedicated to lateral steering after the time period expires.

23. The method of claim 22, comprising automatically computing an estimate of how much of the over-steering to perform based on water current velocity.

24. A method comprising:
(a) laterally over-steering a towed marine seismic source using one or more actively controllable mechanisms;
(b) stopping the lateral over-steering of the mechanism during a time period in which seismic reflections from a sub-surface geological feature of interest are being recorded;
(c) allowing the towed marine seismic source to drift with a prevailing current during the time period; and
(d) resuming lateral over-steering of the mechanism after the time period expires.

25. The method of claim 24 comprising automatically computing an estimate of how much of the over-steering to perform based on water current velocity.

* * * * *